July 28, 1953      S. G. HIRSCH      2,646,939
FISHING REEL CONSTRUCTION
Filed Aug. 15, 1949      2 Sheets-Sheet 1
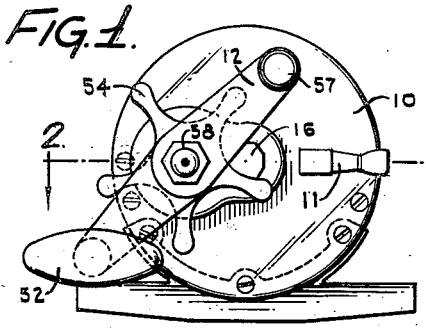
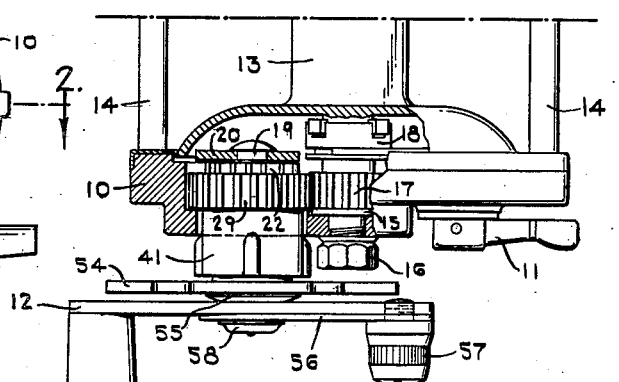
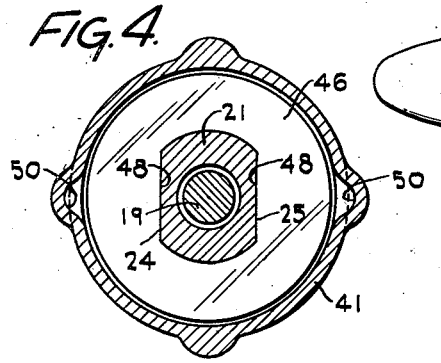
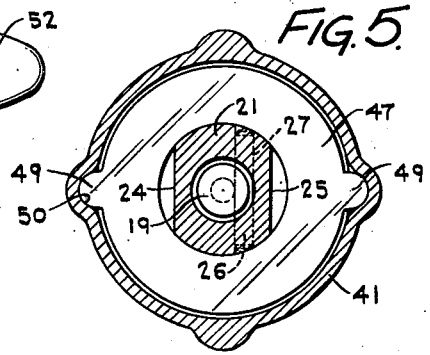
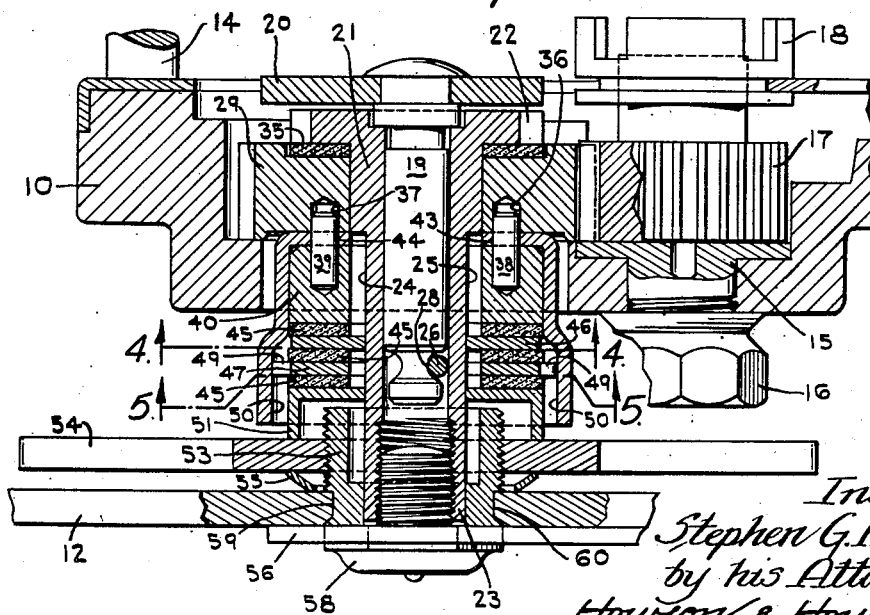
Inventor:
Stephen G. Hirsch
by his Attorneys
Howson & Howson July 28, 1953
S. G. HIRSCH
2,646,939
FISHING REEL CONSTRUCTION
Filed Aug. 15, 1949
2 Sheets-Sheet 2
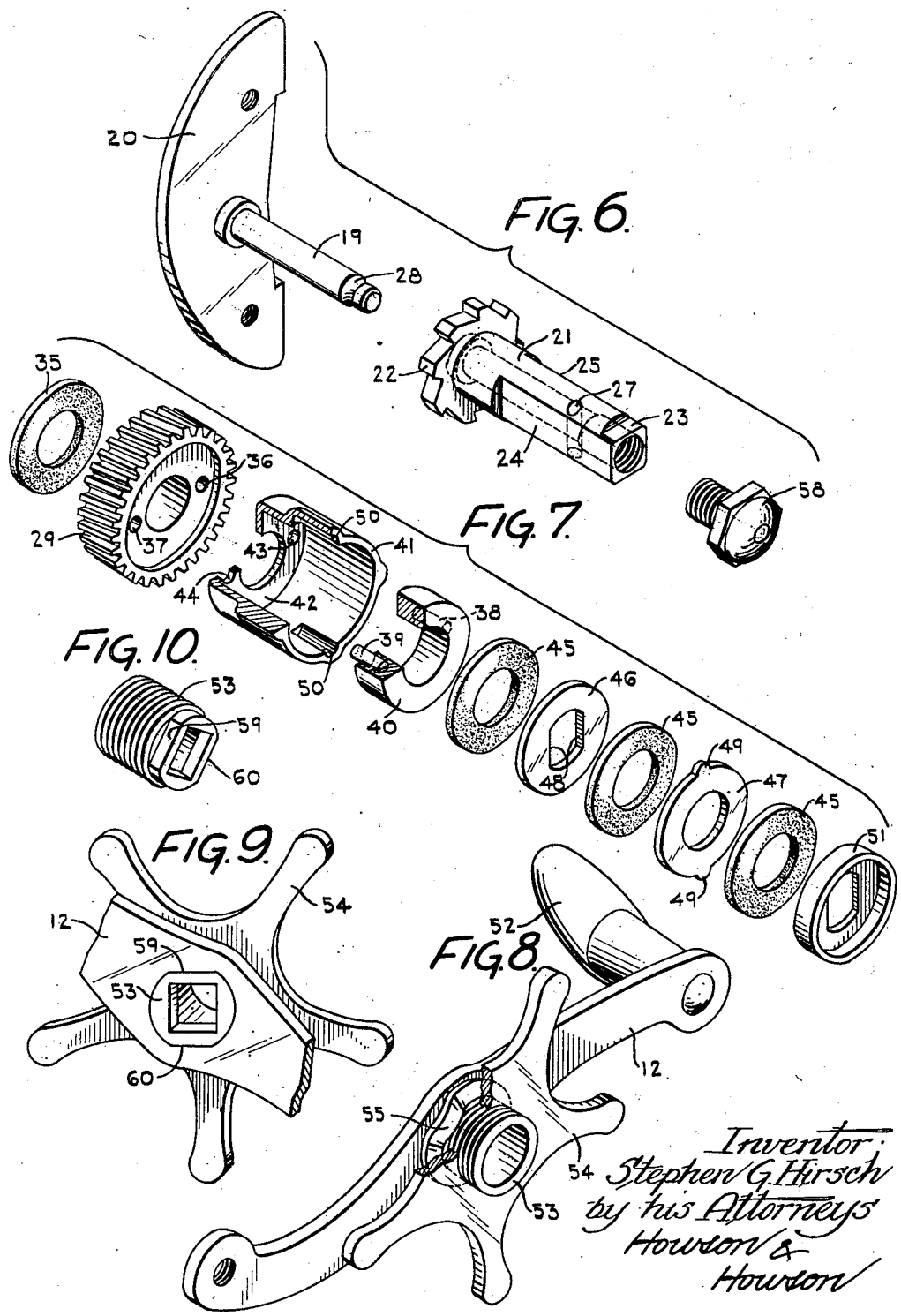
Inventor:
Stephen G. Hirsch
by his Attorneys
Howson &
Howson Patented July 28, 1953

2,646,939

UNITED STATES PATENT OFFICE 2,646,939

FISHING REEL CONSTRUCTION

Stephen G. Hirsch, Philadelphia, Pa., assignor to Ocean City Mfg. Co., Philadelphia, Pa., a corporation of Pennsylvania Application August 15, 1949, Serial No. 110,391

6 Claims. (Cl. 242—84.5)

This invention relates to fishing reels and more particularly to an improved drag assembly for a fishing reel.

A disadvantage of prior fishing reel construction has resided in the fact that the drag parts which serve as a brake and/or driving connection between the handle and the spool, have been relatively inaccessible for cleaning and replacement of drag washers and special tools have been required in order to assemble one or more of the cooperating parts correctly.

A primary object of the invention therefore, is to provide an improved drag assembly for fishing reels which may be removed in its entirety without disassembling the reel or either of the end plates.

A further object of the invention is to provide a handle and star construction for fishing reels which may be removed and installed in a minimum of time and with a maximum of ease.

A still further object of the invention is to provide an externally mounted housing for the drag parts which is retained in place by axial pressure between the drag washers and the gear which is driven by the reel handle.

A still further object of the invention is to provide a housing for the drag washers which rotates with the gear actuated by the handle.

Further objects will be apparent from the specification and drawings in which:

Fig. 1 is a side elevation of a fishing reel constructed in accordance with the invention;

Fig. 2 is an enlarged sectional detail as seen at 2—2 of Fig. 1;

Fig. 3 is an enlarged sectional detail of a part of the structure of Fig. 2;

Fig. 4 is an enlarged sectional detail as seen at 4—4 of Fig. 3;

Fig. 5 is an enlarged detail as seen at 5—5 of Fig. 3;

Figs. 6 and 7 are exploded views showing the drag assembly and its associated parts;

Fig. 8 is a perspective of the handle and star;

Fig. 9 is a perspective of the opposite side of the star and handle; and

Fig. 10 is a perspective of the star drag screw.

The invention comprises essentially the provision of a hollow cylindrical housing partially closed at one end, which is adapted to be compressed between the drag washers and the driving gear. The housing is provided with axial grooves adapted to engage the ears on a drag washer to prevent relative rotation thereof. The handle is integrally secured to the star drive screw so that these two pieces when once assembled never come apart. This construction greatly facilitates assembly of the reel and especially the handle and star.

Referring now more particularly to the drawings, a fishing reel as shown in Figs. 1-3 comprises an end plate 10, a release lever 11, a handle 12, and a spool 13. The opposite end plate (not shown) journals the other end of spool 13 and is connected to end plate 10 by means of spacer rods 14, 14. Spool 13 is journaled in end plate 10 by means of bushing 15 which is secured to the end plate by nut 16 and is drivingly connected to gear 17 by means of coupling 18.

A gear post 19 (Fig. 3) is riveted to bridge 20 in a manner designed to carry the driving and drag parts for spool 13. Gear sleeve 21 is journaled on gear post 19 and is provided with a ratchet 22 at one end and a square shoulder 23 (Fig. 6) at the other end. The intermediate shank of the gear sleeve has a pair of axially extending flats 24 and 25 which perform a function to be described more fully hereinafter. Gear sleeve 21 is retained axially on gear post 19 by means of a pin 26 positioned in hole 27 of the sleeve and in registry with an undercut annular groove 28 at the end of gear post 19. The periphery of gear sleeve 21 adjacent ratchet 22 journals the main driving gear 29 for spool 13. Gear 29 meshes with gear 17 and is freely rotatable on gear sleeve 21. The inner face of gear 29 is recessed to receive a fiber friction washer 35 adapted to be compressed between the side face of ratchet 22 and gear 29, whereas the opposite side of gear 29 is provided with a pair of diametrically spaced recesses 36 and 37 adapted to receive a pair of pins 38 and 39 securely mounted in the gear pin block 40. The drag cup 41 is of cylindrical construction and has an abutment 42 with apertures 43 and 44 through which pins 38 and 39 extend to provide a driving connection between block 40 and gear 29. It will be understood that the pins 38 and 39 have a slip fit in apertures 43 and 44 and in gear 29.

The drag proper consists of a plurality of friction drag washers 45, 45 which are alternately positioned between a metallic sleeve washer 46 and a metallic drag cup washer 47. The bore of washer 46 is provided with flats 48, 48 which have a sliding fit on flats 24, 25 of sleeve 21 so that washer 46 is non-rotatably mounted on the sleeve. The bore of washer 47, however, is completely round but its outer periphery is provided with a pair of ears 49, 49 which slidably fit in axial channels 50, 50 of drag cup 41. It will thus be understood that washer 46 is rotatable within cup 41 but non-rotatable on sleeve 21. Washer 47 however, is rotatable on sleeve 21 but is rotatably fixed with respect to cup 41. Axial pressure between the drag pressure cup 51 and washers 45, 46 and 47 serves to compress the washers axially together, thereby transmitting torque from the sleeve 21 to the cup 41. Fiber washer 35 carries the counteracting thrust or axial force which may be imposed upon the drag washers 45–47 as well as cup 41 and gear 29.

The handle 12 is provided with a knob 52 and a threaded drag screw 53 which is securely attached to handle 12 as by riveting. The star 54 is mounted on the external threads of drag screw 53 and may be moved axially in and out on screw 53. Spring 55 serves as a lock and as a resilient abutment for the limit of travel of star 54 in an outward direction. As the star 54 is rotated clockwise on screw 53, axial force is applied to washers 45–47 by means of axial thrust imparted to pressure cup 51. In this position, the gear 29 is effectively locked to sleeve 21 through the drag parts and the spool 13 may be turned by means of handle 12 to wind in the line. In this position the maximum resistance to line payout is obtained. When the star 54 is in the completely retracted position, compressing spring washer 55, the drag connections between gear 29 and sleeve 21 are disengaged thus preventing rotation of the spool by means of the handle and also permitting free line payout. Intermediate positions provide varying degrees of drag in accordance with the fisherman's desires.

To remove the drag assembly, it is only necessary to release the handle wrench 56 by loosening knurled screw 57. Turning the wrench then loosens the handle screw 58. After screw 58 has been removed, the handle and star may be removed from sleeve 21 as a unit, thereupon the drag cup 41 together with all the parts contained therein, may be slipped over the square shoulder 23 of sleeve 21 without disturbing any other part of the reel. To re-assemble, it is necessary only to reverse the above procedure. Since sleeve 21 is free to turn in a clockwise direction due to ratchet 22, it is important that some means be provided for holding sleeve 21 stationary when screw 58 is tightened. The integral rigid construction of drag screw 53 and handle 12 serves this purpose. It will be noted that screw 53 is provided with a pair of shoulders 59 and 60 which securely prevent relative rotation between screw 53 and handle 12. The square bore of screw 53 effectively prevents rotation of sleeve 21 when screw 58 is tightened by means of wrench 56.

It will thus be understood that I have provided a relatively simple and inexpensive drag mechanism for fishing reels which may be quickly removed from the reel as a unit without disturbing any other part of the wheel and without the necessity of removing either end plate. Furthermore, the handle and star may be tightly secured to the gear sleeve without any other tools than those supplied with the reel since the handle serves to rigidly control rotation of the sleeve at all times.

Having thus described my invention, I claim:

1. In a fishing reel comprising a pair of spaced parallel end plates having a spool rotatably mounted therebetween and a gear drivably connected to the spool, a member rotatably mounted in said reel and extending outwardly through an opening in one of said end plates, a driving gear rotatably carried by said member in engagement with said first gear, a drag cup positioned about said member and extending inwardly through said end plate opening into engagement with said driving gear, means drivably connecting said drag cup with said driving gear, friction drive means disposed about said member interiorly of said cup interconnecting said member with said cup, and mechanism including a rotatable star wheel operable to exert pressure on said friction drive means and drivably interconnect said member with said cup to cause rotation of the driving gear upon similar rotation of said member.

2. In a fishing reel comprising a pair of spaced parallel end plates having a flanged spool rotatably mounted therebetween and a gear drivably connected to the spool, a gear sleeve rotatably mounted in said reel and extending outwardly through an opening in one of said end plates, an operating handle removably secured to the outer end of said gear sleeve and rotatable therewith, a driving gear rotatably carried by said sleeve in engagement with said first gear, a drag cup positioned about said sleeve and extending inwardly through said end plate opening into engagement with said driving gear, means drivably connecting said drag cup with said driving gear, friction drive means disposed about said sleeve interiorly of said cup interconnecting said sleeve with said cup, and mechanism including a rotatable star wheel outwardly adjacent said cup operable to exert pressure on said friction drive means axially of said sleeve and drivably interconnect said sleeve with said cup to cause rotation of the driving gear upon similar rotation of the operating handle.

3. In a fishing reel comprising a pair of spaced parallel end plates having a spool rotatably mounted therebetween and a gear drivably connected to the spool, a flanged gear sleeve rotatably mounted in the reel and extending outwardly through an opening in one of said end plates, a driving gear rotatably carried by said sleeve in engagement with said first gear, a drag cup positioned about said sleeve extending inwardly through said end plate opening into engagement with said driving gear, a member removably carried by said cup and having means thereon extending through said drag cup into engagement with said driving gear to cause rotation of said drag cup with said driving gear, a first metallic washer mounted in the drag cup on said sleeve and rotatable with the gear sleeve, a second metallic washer mounted in said drag cup and rotatable therewith, a friction washer positioned between said first and said second metallic washers, and mechanism including a rotatable star wheel outwardly adjacent said cup operable to frictionally engage the said metallic washers with the friction washer and thereby drivably connect said sleeve with said cup to cause rotation of the driving gear upon similar rotation of said sleeve.

4. In a fishing reel comprising a pair of spaced parallel end plates having a flanged spool rotatably mounted therebetween and a gear drivably connected to the spool, a flanged gear sleeve rotatably mounted in the reel and extending outwardly through an opening in one end plate, a driving gear rotatably carried by said sleeve in engagement with said first gear, a drag cup positioned about said sleeve extending inwardly through said end plate opening into engagement with said driving gear, a block member positioned interiorly of said cup and having means thereon extending through said drag cup into engagement with said driving gear to cause rotation of said drag cup with said driving gear, a first metallic washer mounted in the drag cup on said sleeve and rotatable with the sleeve, a second metallic washer mounted in said drag cup and rotatable therewith, a friction washer positioned between said first and said second metallic washers, and mechanism including a rotatable star wheel outwardly adjacent said cup operable to exert pressure on said washers axially of said sleeve and thereby drivably connecting said sleeve with said cup to cause rotation of the driving gear upon similar rotation of said sleeve.

5. In a fishing reel comprising a pair of spaced parallel end plates having a flanged spool rotatably mounted therebetween and a gear drivably connected to the spool, a bridge mounted on one of said end plates between the spool flange and said one end plate, a post rigidly mounted on said bridge, a flanged gear sleeve rotatably mounted on said post and extending outwardly through an opening in said one end plate, a driving gear rotatably carried by said sleeve in engagement with said first gear, a drag cup positioned about said sleeve extending inwardly through said end plate opening into engagement with said driving gear, a block member positioned interiorly of said cup and having means thereon extending through said drag cup into engagement with said driving gear to cause rotation of said drag cup with said driving gear, a first metallic washer mounted in the drag cup on said sleeve and rotatable with the sleeve, a second metallic washer mounted in said drag cup and rotatable therewith, a friction washer positioned between said first and said second metallic washers, mechanism including a rotatable star wheel outwardly adjacent said cup operable to exert pressure on said washers axially of said sleeve and thereby drivably connect said sleeve with said cup to cause rotation of the driving gear upon similar rotation of said sleeve, and an operating handle removably secured to said sleeve outwardly adjacent said star wheel to rotate said sleeve and said cup.

6. In a fishing reel comprising a pair of spaced parallel end plates having a flanged spool rotatably mounted therebetween and a gear drivably connected to the spool, a bridge mounted on one of said end plates between the spool flange and said one end plate, a post rigidly mounted on said bridge, a flanged gear sleeve rotatably mounted on said post and extending outwardly through an opening in said one end plate, a driving gear rotatably mounted on said gear sleeve, a hollow drag cup having a plurality of axial grooves in the periphery thereof positioned about said gear sleeve and extending interiorly of said opening, a gear block positioned in the bottom of said cup, at least one pin anchored in said gear block extending through the bottom of the cup into engagement with said driving gear, a plurality of drag washers contained in said cup, at least one of said washers connected with the grooves in the cup to prevent relative rotation therebetween, at least one other of said washers being non-rotatably mounted on said gear sleeve, a drag screw non-rotatably mounted on the gear sleeve, a threaded portion on said screw extending beyond the outer edge of the cup, a star wheel mounted on said threaded portion beyond the outer edge of the cup, an axial pressure transmitting member between the star wheel and the drag washers for adjusting the frictional contact of the washers in accordance with the axial position of the star wheel on the drag screw, an operating handle carried by said drag screw, and means to secure said drag screw to said gear post.

STEPHEN G. HIRSCH.

References Cited in the file of this patent

UNITED STATES PATENTS

| Number | Name | Date |
|---|---|---|
| 942,187 | Ravenshaw | Dec. 7, 1909 |
| 1,427,025 | Schlafly | Aug. 22, 1922 |
| 1,697,851 | Case | Jan. 8, 1929 |
| 1,932,360 | Adams | Oct. 24, 1933 |
| 2,360,488 | Garman | Oct. 17, 1944 |